United States Patent [11] 3,619,291

| [72] | Inventors | Felix Joseph Germino<br>Palos Park;<br>Joseph Frank Stejskal, Brookfield; William Edward Schaffrath, Chicago, all of Ill. |
|---|---|---|
| [21] | Appl. No. | 758,122 |
| [22] | Filed | Sept. 6, 1968 |
| [45] | Patented | Nov. 9, 1971 |
| [73] | Assignee | CPC International Inc. |

[54] DESOLVENTIZING OF STARCH
14 Claims, No Drawings

[52] U.S. Cl. .................................................. 127/71,
127/39, 203/96, 260/233.3
[51] Int. Cl. .................................................. C13l 1/04,
C13l 1/00, C13l 3/00
[50] Field of Search ........................................ 127/32, 38,
71; 260/233.3 A, 412.4, 412.8; 203/96

[56] References Cited
UNITED STATES PATENTS
2,612,468  9/1952  Morrell et al. ................. 203/96 X
OTHER REFERENCES
Meetgeert, " Fractionation of Starch," Advances in Carbohydrate Chemistry, 16:301–19 (1963).

*Primary Examiner*—Morris O. Wolk
*Assistant Examiner*—D. G. Conlin
*Attorneys*—Frank E. Robbins, James L. Bailey, Janet E. Price, Robert D. Weist and Martha A. Michaels

ABSTRACT: Starch which has been treated with a hydrophilic organic solvent, such as a low molecular weight alcohol, ketone, or the like, and which, as a result, retains relatively large quantities of these solvents, is desolventized by admixing it with a gel retarding salt, and heating the admixture to a temperature above about 150° F. The process is applicable to any type or variety of starch in nongelatinized form; the process does not gelatinize or otherwise affect the properties of the starch.

DESOLVENTIZING OF STARCH

This invention relates to a process for removing nonaqueous, volatile, hydrophilic, organic solvents from sensitive materials. More particularly, this invention relates to a process for removing such organic solvents from starch.

In many processes for modifying the physical and chemical properties of starch, it is sometimes necessary to employ an organic solvent, such as low molecular weight alcohol or ketone, to obtain the desired property. For example, the solvent may function as a reaction medium to prevent starch swelling during a chemical treatment, as a solvent for water-insoluble chemical reagents to facilitate their reaction with starch, or as solvents for reagent byproducts which are difficult to remove with water. Also, organic solvents may be used to dissolve and thereby remove naturally occurring fats from starch. Uses of organic solvents to accomplish these functions are well known, but no effective method has been developed for substantially complete removal of such solvents from the starch after treatment. Such removal is, of course, necessary if the starch is to be used for food purposes. Conventional purification treatments do not effectively remove the residual solvent regardless of the degree of treatment.

It is hypothesized that most of the solvent is easily removed using conventional separation systems such as filtration or centrifugation followed by conventional drying methods but that the remainder of the solvent is more tenaciously held in the starch by some physical forces, such as adsorption or complexing with the starch. These residual solvent levels are not removed to acceptable food grade levels by the aforementioned conventional systems, nor are they removed by prolonged water washing, where applicable, or by washing with nonaqueous solvents such as carbon tetrachloride as reported by Valletta, et al. (Journal of Polymer Science: Part A, Volume 2, pp. 1085-1094, 1964) or treatment with dry gases such as hot air, hexane or carbon dioxide, nor by drying to constant weight at 113° C. over $P_2O_5$ in vacuo as reported by Valletta, et al.

An evaluation of residual solvent levels in such exposed and treated starches after drying by conventional methods ranges as follows:

| Drying Method | Solvent | Residual Solvent (p.p.m.) |
| --- | --- | --- |
| Flash Drying | Methanol | 10,000-50,000 |
| Vacuum Drying: | | |
| Stokes Vacuum Oven: 4 Hours, 212° F., 23 Inches Vacuum | Methanol | 5,000-12,000 |
| Laboratory Vacuum Oven: 4 Hours, 120° C., 30 Inches Vacuum | Methanol | 1,000-5,000 |
| Forced Air Oven (Tray Type) | | |
| 60° C. — 16 Hours | Methanol | 1,000-8,000 |
| 60° C. — 16 Hours | Acetone | 9,000 |
| 60° C. — 16 Hours | Ethanol | 13,000 |
| 60° C. — 16 Hours | Isopropanol | 15,000 |
| 60° C. — 16 Hours | Dioxane | 15,000 |

Furthermore, water washing of a methanol-treated nongelatinized starch such as corn starch results in a residual methanol level of from 400 to 1000 p.p.m. It has been reported by Valletta, et al., that starches treated in the presence of methanol or n-propanol after being washed three times with carbon tetrachloride still retained 0.67 percent methanol or 1.4 percent n-propanol. When the nongelatinized starches containing alcohol are exposed to a flow of hot dry air, hexane or carbon dioxide, they exhibit no significant change in residual solvent level from that remaining after conventional drying.

The employment of high temperatures is required for the removal of the solvent, e.g., temperatures in excess of 150° F., since the heating of the starch is conducted in the presence of water. However, such heating of the starch in the form of a slurry, causes gelling or pasting of the starch. Such gelling or pasting of the starch slurry is highly undesirable since this, in turn, causes particles destruction and granular damage to the starch, thereby affecting the filterability of the starch granule. If this occurs, the starch is thereby rendered unsuitable for use in the manufacture of products such as confectioneries including gum drops.

It is therefore an object of the present invention to develop a simple, economical, and commercially feasible process for the removal of hydrophilic organic solvents from starch.

A further object of the invention is to desolventize starch without affecting the filterability thereof.

A more specific object is to prepare a nongelatinized starch containing an extremely low level (less than about 100 p.p.m.) of a hydrophilic solvent.

These and other objects are accomplished by the process of the present invention which comprises forming an aqueous admixture of the starch and a gel retarding salt, and heating the admixture to a temperature above about 150° F. for a time sufficient to reduce the solvent level to the desired degree. Surprisingly, the present process provides a practical and economical method for the removal of residual solvents from nongelatinized starches without gelatinizing the starch or otherwise affecting its properties.

The present process can be employed to provide starches having a residual solvent content below about 200 p.p.m. and preferably below about 100 p.p.m. By employing the "gel retarding salts" of the present invention, low solvent levels are achieved without attendant pasting or gelling of the starch. Thus, a desolventized starch results without undesirable particle damage and loss of filterability of the starch granule.

More specifically, the present invention provides a process of reducing the organic solvent level of starch to about 100 p.p.m., by forming an aqueous admixture of the starch and a gel retarding salt, and heating the admixture to a temperature between about 150° and about 210° F., preferably between about 160° and about 200° F., with 190° F. being especially preferred when methanol is the solvent to be removed. The aqueous admixture is heated for a time sufficient to reduce the solvent to a desired level and the admixture is then physically treated for the removal of liquid. For example, filtering or centrifuging of the resultant starch slurry may be employed. Next, the starch which may be in the form of a cake, is washed with water for the removal of the gel retarding salt. The starch may be then dried and processed by conventional procedures. It may be desirable, in some instances to treat the starch with water prior to the employment of the gel retarding salt so as to first recover any easily removable solvent.

The term "gel retarding salt" as employed herein includes, for example, sodium sulfate, magnesium sulfate, disodium phosphate, sodium tartrate, sodium citrate, and the like and mixtures of such salts. In general, however, any inorganic salt having the characteristic of retarding gel formation under temperatures between about 150° and about 210° F. while permitting removal of the solvent, is a suitable gel retarding salt for the purposes of the present process.

The aqueous admixture of the starch and the gel retarding salt is heated for a time sufficient to reduce the solvent to the desired level under the treatment conditions employed. As will be seen hereinafter from the examples, the treatment times are generally quite short. For example, between about 5 minutes and about 6 hours, preferably between about one and about 6 hours is a suitable treatment time to lower the solvent level to the desired level. It should be noted, that extended treatment times do not adversely affect the properties of the starch. Accordingly, there is no actual "upper limit" to the time of treatment, except that an unnecessarily long treatment time would adversely affect the economics of the process.

The pressures employed may be varied over a wide range depending upon the particular solvent to be removed and the temperature employed. Thus, subatmospheric, atmospheric and superatmospheric pressures may be suitably employed. However, atmospheric pressures are preferred from the standpoint of economy, since expensive pressurized vessels need not be employed.

The desolventizing method of the present invention may be conducted in any suitable manner whereby the starch contacts the gel retarding salt to form an aqueous admixture. Thus, for example, this starch may be merely dispersed in an aqueous solution of the gel retarding slat in a suitable vessel employing a so-called "batch" process. The resulting slurry is merely removed from the vessel and passed by a suitable means for the removal of residual liquid, e.g., filter, centrifuge and the like, and for the formation of a starch cake. The resulting cake may be washed with water, dried and processed as desired. According to another mode of operation, the starch containing the solvent may be slurried in water and then admixed with the gel retarding salt employing a continuous cooker to heat the slurry. The salt solutions can be recovered and recycled for admixture with fresh starch to be desolventized. Accordingly, any suitable means of contacting the starch and gel retarding salt under suitable processing temperature conditions may be employed.

The process of the present invention is applicable for the desolventizing of "sensitive materials." As employed herein this term includes materials that can be damaged, or whose physical and/or chemical properties can be altered, when subjected to conditions or moisture and/or high temperature. Examples of such materials are protein, vegetable gum and starches. Although the foregoing discussion has been made in connection with starch, it should be understood that the present process is equally applicable to the removal of organic solvents from other sensitive materials as well.

The process of the present invention is applicable for desolventing all varieties of starch (e.g., those derived from any source, such as corn, high amylose corn, wheat, potato, waxy maize, tapioca, sorghum, sago, rice, etc.); starch fractions (i.e. amylose or amylopectin); derivatized starches (e.g., esterified or etherified starch); modified starches (such as thin-boiling starch); and converted starches. Accordingly, the term "starch" as employed in the specification and claims will be understood to include any and all of the aforementioned.

The present process is suitable for removing nonaqueous volatile, hydrophilic, organic liquids from sensitive materials. The term "solvent" as employed herein will be used to denote nonaqueous, volatile, hydrophilic, organic liquids, such as low molecular weight alcohols or ketones, e.g. methanol, ethanol, isopropanol, acetone, etc. and like materials such as dioxane.

The concentration of the gel retarding salts may be varied over a wide range depending upon various factors including the particular salt employed, the temperature employed, the contact time, etc. However, suitable salt concentrations include between about 1 and about 3 mols of the gel retarding salt per liter of water present, preferably between about 2 and about 2.5 mols per liter.

The following examples will illustrate the practice of the present invention. They are presented for illustrative purposes only, and should not be construed as limiting the scope of the invention in any way.

EXAMPLE 1

This example illustrates methanol removal from starch employing a sodium sulfate solution as the gel retarding salt.

One thousand grams of a 50 percent starch cake containing in excess of 20,000 parts per million of methanol are dispersed in 1000 grams of a 2-molar sodium sulfate solution that is heated to a temperature of 190° F. in a constant temperature bath. The sample is held for a period of 1 hour at 190° F. and aliquots are removed at specific time intervals. At the end of 15 minutes, the methanol content of the starch product is 180 parts per million. At the end of 1 hour, the starch product contains only 100 parts per million of residual methanol.

The desolventized starch product is formed into gum drops and has an acceptable "sand time" equivalent to 45 minutes. This indicates that the desolventization process of the present invention effectively removes methanol from the starch without causing granular damage to the starch.

EXAMPLE 2

This example illustrates the employment of a slightly higher molar concentration of sodium sulfate as a gel inhibiting salt for the removal of methanol.

A water washed starch cake containing residual methanol having a weight of 6100 grams of which 3350 grams comprise the dry starch is added to a salt solution comprising 1870 grams of sodium sulfate and 4830 grams of water. 1060 grams additional sodium sulfate is added to the aqueous starch slurry and the entire mixture is heated to a temperature of 200° F. Aliquot portions are removed at specified intervals and the methanol content of the starch is measured. The results of this experiment are set forth below in table 1:

TABLE 1

| Salt | Molar Conc. | Temp., °F. | Residence Time (min.) | Residual Methanol (p.p.m.) |
| --- | --- | --- | --- | --- |
| Sodium Sulfate | 2.7 | 200 | 5 | 143 |
| | | | 15 | 101 |
| | | | 30 | 91 |
| | | | 45 | 72 |
| | | | 60 | 65 |

Upon viewing table 1 it may be seen that within 15 minutes at 200° F., the methanol content of the starch is reduced to 101 p.p.m., while after 60 minutes the methanol content is 65 p.p.m.

A comparison of this example with the results obtained in example 1 indicates that a greater amount of methanol may be removed employing a slightly higher concentration of sodium sulfate within the same time period.

EXAMPLE 3

This example illustrates the employment of magnesium sulfate as a gel retarding salt in the reduction of the methanol content of the nongelatinized starch.

A prewater washed starch cake comprising 6100 grams of which 3350 grams consist of starch is admixed with an aqueous salt solution comprising 2010 grams of magnesium sulfate and 5370 grams of water at a temperature of 190° F. As before, aliquots are taken at predetermined time intervals and the methanol content of the aliquot portions is measured. The results are set forth below in table 2:

TABLE 2

| Salt | Molar Conc. | Temp., °F. | Residence Time (min.) | Residual Methanol (p.p.m.) |
| --- | --- | --- | --- | --- |
| Magnesium Sulfate | 2.0 | 190 | 5 | 109 |
| | | | 15 | 90 |
| | | | 30 | 66 |
| | | | 45 | 63 |
| | | | 60 | 62 |

The results in table 2 illustrate that an even lower residual methanol content is provided by the employment of magnesium sulfate than is possible under the same conditions employing sodium sulfate. Additionally, less magnesium sulfate is required to achieve the desired methanol level.

EXAMPLE 4

A water washed starch cake weighing 3200 grams and comprising 1600 grams on a dry basis is admixed with a salt solution comprising 1195 grams of a phosphate mixture comprising 80 percent $Na_2HPO_4$ and 20 percent $NaH_2PO_4$ and 2475 grams of water. The resulting admixture is maintained at a temperature of 190° F. and samples are taken at time intervals as before. The results are set forth in table 3 below:

TABLE 3

| Salt Mixture | Molar Conc. | Temp., °F. | Time (min.) | Residual Methanol (p.p.m.) |
| --- | --- | --- | --- | --- |
| Na₂HPO₄ (80%) NaH₂PO₄ (20%) | 2.0 | 190 | 5 | 258 |
| | | | 15 | 173 |
| | | | 30 | 133 |
| | | | 45 | 110 |
| | | | 60 | 85 |

Thus, as may be seen upon viewing table 3, the residual methanol content of the starch is reduced to 85 within one hour and a starch product suitable for use for food purposes is provided.

EXAMPLE 5

A starch cake containing methanol is treated with a two molar sodium citrate solution at a temperature of 190° F. for a period of 60 minutes.

The residual methanol content of the starch is measured at the end of the one hour period and the starch contains only 175 p.p.m. residual methanol. No granular damage results and therefore it may be concluded that sodium citrate is an effective gel retarding salt suitable in methanol desolventization.

EXAMPLE 6

In the foregoing manner, a starch cake containing residual methanol is treated with a 2.0 molar solution of sodium tartrate at a temperature of 190° F. After a period of 60 minutes, a residual methanol content of the starch is measured and is found to be 150 parts per million. The resulting starch shows no granular damage indicating that sodium tartrate is likewise an effective gel retarding salt suitable for employment of the present invention.

EXAMPLES 7-11

The following examples illustrate the effect of temperature upon the removal of methanol from starch employing a 2.0-molar salt solution of three of the preferred gel retarding salts of the present invention.

The residual methanol content of methanol-contaminated starch cake is measured at the temperatures indicated in table 4 below, after a 15-minute hold period in each instance:

TABLE 4

| Example No. | Temp., °F. | Sodium sulfate (p.p.m. methanol) | Magnesium sulfate (p.p.m. methanol) | Mixture of NaH₂PO₄ and Na₂PO₄ (p.p.m. methanol) |
| --- | --- | --- | --- | --- |
| 7 | 160 | 406 | 397 | 495 |
| 8 | 170 | 347 | 320 | 388 |
| 9 | 180 | 246 | 200 | |
| 10 | 190 | 155 | 190 | 173 |
| 11 | 200 | 101 | 108 | |

Upon viewing the foregoing table, it may be seen that the methanol removal increases with increasing temperatures employing each of the salts at the concentrations indicated. The starch granules were not adversely affected even at the high temperature of 200° F. and gelling was inhibited while the methanol content was reduced to a desirable level in each instance. Thus, the employment of temperatures above the normal gelatinization temperature are utilized for the desolventization of starch while at the same time the present salts are used which act to inhibit gelatinization and granule swelling.

EXAMPLE 12

Sodium sulfate in an amount of 142.05 grams is dissolved in 500 milliliters of water to which 334 grams of a methanol wet cake (comprising 200 grams of dry starch) is added, thus forming a 2M solution of the sodium sulfate. This admixture is heated to a temperature of 180° F. and is filtered slowly at a temperature of 180° F. The starch at this stage is observed under a microscope which indicates that there is no apparent loss of birefringence due to heating.

The resulting filter cake is reslurried in 500 milliliters of water containing 142.05 grams of sodium sulfate and the admixture is heated to a temperature of 180° F. and held for 10 minutes at this temperature. The starch is again filtered and reslurried in 500 milliliters of water containing the same amount of sodium sulfate. Again, the admixture is heated to 180° F. and is held for a period of 10 minutes and filtered. The starch is cooled to 140° F. and is washed copiously with 4000 milliliters of water at a temperature of 140° F.

The resulting starch comprising 94.0 percent dry substance contains only 123 parts per million residual methanol.

EXAMPLE 13

Two hundred grams (dry substance) of a methanol-contaminated starch cake that had been washed with water is slurried in 500 milliliters of a 2M sodium sulfate solution. The admixture is heated to a temperature of 190° F. and is held for a period of 10 minutes at that temperature following which the starch is filtered employing a jacketed Buchner filter.

Next, the starch is washed with 1000 milliliters with a 1M sodium sulfate solution at a temperature of 190° F. and is then washed with 2500 milliliters of distilled water at a temperature of 140° F.

The resulting starch contains 106 p.p.m. methanol and is of a good quality.

EXAMPLE 14

Two hundred grams of a methanol-contaminated starch cake is admixed with a 2N sodium sulfate solution at a temperature of 180° F. for a period of 10 minutes. The resulting starch is filtered out and is washed with a 1N sodium sulfate solution in water at a temperature of 140° F.

The starch sample is found to have a methanol content of 117 parts per million and is of good quality, as before.

EXAMPLE 15

This example illustrates the process of the invention via a continuous scheme.

An aqueous slurry of starch and sodium sulfate, each in amounts set out in example 2 are processed in a continuous manner, by first pumping the slurry through a VOTATOR heat exchanger whereby the slurry is heated rapidly to 200° F. From the heat exchanger the heated slurry is then sent into the bottom of a chamber in which the hold time at the 200° F. processing temperature is that time required for the slurry to overflow the chamber. In this instance, 91 p.p.m. methanol is obtained for a 30-minute residence time. The overflow stream is then continuously filtered and washed.

While the invention has been described in connection with specific embodiments thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

The invention is hereby claimed as follows:

1. A process for treating nongelatinized starch which contains retained solvent, without adversely affecting the properties of the starch, which comprises forming an aqueous admixture of the starch and a gel retarding salt, while maintaining the admixture at a temperature above about 150° F. for a time sufficient to reduce the amount of solvent to a desired level, said gel retarding salt being a member selected from the group consisting of sodium sulfate, magnesium sulfate, disodium phosphate, sodium tartrate, sodium citrate, a mixture of disodium phosphate and monosodium phosphate, and mixtures thereof.

2. The process of claim 1 wherein the gel retarding salt is sodium sulfate.

3. The process of claim 1 wherein the gel retarding salt is magnesium sulfate.

4. The process of claim 1 wherein the gel retarding salt is a mixture of disodium phosphate and monosodium phosphate.

5. The process of claim 1 wherein the admixture is maintained at a temperature of between 150° F. and 210° F.

6. The process of claim 1 wherein the admixture is maintained at a temperature of between about 160° F. and about 200° F.

7. The process of claim 1 wherein the admixture is washed with water after the solvent level has been reduced to the desired level so as to eliminate residual gel retarding salt.

8. A process for treating nongelatinized starch which contains methanol to reduce the amount of methanol to below 200 parts per million without adversely affecting the properties of the starch, which comprises washing said starch with water, and forming an aqueous admixture of the resulting methanol-depleted starch and a gel retarding salt while maintaining the admixture at a temperature above about 150° F. for a time sufficient to reduce the amount of solvent to the desired level, said gel retarding salt being a member selected from the group consisting of sodium sulfate, magnesium sulfate, disodium phosphate, sodium tartrate, sodium citrate, a mixture of disodium phosphate and monosodium phosphate, and mixtures thereof.

9. The process of claim 8 wherein the gel retarding salt is sodium sulfate.

10. The process of claim 8 wherein the gel retarding salt is magnesium sulfate.

11. The process of claim 8 wherein the gel retarding salt is a mixture of disodium phosphate and monosodium phosphate.

12. The process of claim 8 wherein the admixture is maintained at a temperature of between about 150° F. and 210° F.

13. The process of claim 8 wherein the admixture is maintained at a temperature of between about 160° F. and about 200° F.

14. The process of claim 8 wherein the admixture is washed with water after the methanol level has been reduced to the desired level so as to eliminate residual gel retarding salt.